US009417338B2

(12) United States Patent
Ishii et al.

(10) Patent No.: US 9,417,338 B2
(45) Date of Patent: Aug. 16, 2016

(54) RADIATION IMAGE PICKUP APPARATUS, AND RADIATION IMAGE PICKUP SYSTEM

(71) Applicant: CANON KABUSHIKI KAISHA, Tokyo (JP)

(72) Inventors: Takamasa Ishii, Honjo (JP); Masato Inoue, Kumagaya (JP); Shinichi Takeda, Honjo (JP); Satoru Sawada, Fujioka (JP); Taiki Takei, Okegawa (JP); Kota Nishibe, Honjo (JP)

(73) Assignee: Canon Kabushiki Kaisha, Tokyo (JP)

(*) Notice: Subject to any disclaimer, the term of this patent is extended or adjusted under 35 U.S.C. 154(b) by 162 days.

(21) Appl. No.: 14/092,117

(22) Filed: Nov. 27, 2013

(65) Prior Publication Data

US 2014/0145086 A1 May 29, 2014

(30) Foreign Application Priority Data

Nov. 29, 2012 (JP) ................................ 2012-261485

(51) Int. Cl.
*G01T 1/20* (2006.01)
*G01T 1/202* (2006.01)

(52) U.S. Cl.
CPC ..................................... *G01T 1/202* (2013.01)

(58) Field of Classification Search
CPC .... G21K 2004/10; G21K 4/00; G01T 1/1642; G01T 1/20
See application file for complete search history.

(56) References Cited

U.S. PATENT DOCUMENTS 6,465,861 B1 * 10/2002 Liu et al. ....................... 257/444
6,600,158 B1 * 7/2003 Okada et al. ............ 250/370.11
2002/0162965 A1 * 11/2002 Okada et al. ............ 250/370.11
2003/0017349 A1 1/2003 Brown
2007/0075247 A1 4/2007 Mochizuki
2009/0065705 A1 * 3/2009 Fuchs et al. ............. 250/370.11
2012/0009375 A1 * 1/2012 Sakai et al. ..................... 428/68

* cited by examiner

*Primary Examiner* — David Porta
*Assistant Examiner* — Hugh H Maupin
(74) *Attorney, Agent, or Firm* — Canon U.S.A., Inc., IP Division

(57) ABSTRACT

A radiation image pickup apparatus includes an image pickup panel in which a plurality of image pickup substrates including photoelectric-conversion elements is fixed onto a base, a scintillator portion including a scintillator layer of alkali halide-based columnar crystal and overlaid on the image pickup panel, and a moisture-proof layer provided between the base and the scintillator layer, at least between the plurality of image pickup substrates. The water vapor permeability of the moisture-proof layer is 10 $g/m^2$/day or less.

12 Claims, 9 Drawing Sheets

| NAME OF MATERIAL | EXPERIMENT RESULT | WATER VAPOR PERMEABILITY REPRESENTATIVE VALUE ($g/m^2$/day@100 μm) | FILM THICKNESS OF EXPERIMENT SAMPLE (μm) | WATER VAPOR PERMEABILITY OF EXPERIMENT SAMPLE ($g/m^2$/day) |
|---|---|---|---|---|
| SILICONE | × | 80 | 120 | 66.7 |
| EPOXY | ○ | 10 | 120 | 8.3 |
| URETHANE | ○ | 5 | 120 | 4.2 |
| POLYIMIDE | × | 70 | 10 | 700.0 |
| POLYVINYLIDENE CHLORIDE | ○ | 1 | 10 | 10.0 |
| POLYPARAXYLENE | ○ | 1 | 10 | 10.0 |

RADIATION IMAGE PICKUP APPARATUS, AND RADIATION IMAGE PICKUP SYSTEM

BACKGROUND OF THE INVENTION

1. Field of the Invention

The present invention relates to a radiation image pickup apparatus and a radiation image pickup system, which detect radiation. Particularly, the present invention relates to a radiation image pickup apparatus and a radiation image pickup system used for a medical image diagnosis apparatus, an analyzer, and so on.

2. Description of the Related Art

Recently, a radiation image pickup apparatus having a large area, which is about 40 cm×40 cm, has been developed. US2003/0173493 and US2007/0075247 disclose a structure in which one image sensing surface is formed by arranging, side by side, a plurality of image pickup substrates including photoelectric-conversion elements in order to implement the radiation image pickup apparatus with such a large area. Also, these literatures disclose a structure in which a polyimide film is formed on the plurality of image pickup substrates and between the plurality of image pickup substrates, and a scintillator of alkali halide-based columnar crystal is formed on the polyimide film by vapor deposition.

According to the radiation image pickup apparatus disclosed in US2003/0173493 and US2007/0075247, the plurality of image pickup substrates is fixed onto a base via a connecting member, and the polyimide film is disposed as a planarization layer on the plurality of image pickup substrates and between the plurality of image pickup substrates. With this structure, in the case where moisture enters from between the image pickup substrate and the base through the connecting member, the moisture may enter between the image pickup substrates as well. Since the polyimide film is not capable enough to reduce such moisture entrance, deliquescence of the scintillator or characteristic deterioration thereof may occur due to the moisture.

SUMMARY OF THE INVENTION

Therefore, an object of the present invention is to increase resistance to moisture which may enter from between a plurality of image pickup substrates in a radiation detecting apparatus in which a scintillator is formed on the plurality of image pickup substrates fixed onto a base.

In view of the above-described problem, an embodiment of the present invention includes an image pickup panel in which a plurality of image pickup substrates including photoelectric-conversion elements is fixed onto a base, a scintillator portion which includes a scintillator layer of alkali halide-based columnar crystal and is overlaid on the image pickup panel, and a moisture-proof layer provided between the base and the scintillator layer, at least between the plurality of image pickup substrates. The water vapor permeability of the moisture-proof layer is 10 g/m$^2$/day or less.

According to an embodiment of the present invention, it is possible to provide a radiation detecting apparatus with high resistance to the moisture which may enter from between the plurality of image pickup substrates.

BRIEF DESCRIPTION OF THE DRAWINGS

FIG. 5 is a table illustrating evaluation results of materials for a moisture-proof layer.

DESCRIPTION OF THE EMBODIMENTS

Embodiments of the present invention will be described below with reference to the attached drawings. Note that a repeated description regarding the components which are common in the respective embodiments will be omitted, denoting the components by the same reference symbols. In the following, a description will be given with examples in which the respective embodiments are applied to the radiation image pickup apparatus used for a medical image diagnosis apparatus, an analyzer, and so on. According to an embodiment of the present invention, light includes visible light and infrared radiation, and radiation includes X-ray, $\alpha$-ray, $\beta$-ray, and $\gamma$-ray.

(First Embodiment)

Figure 1:
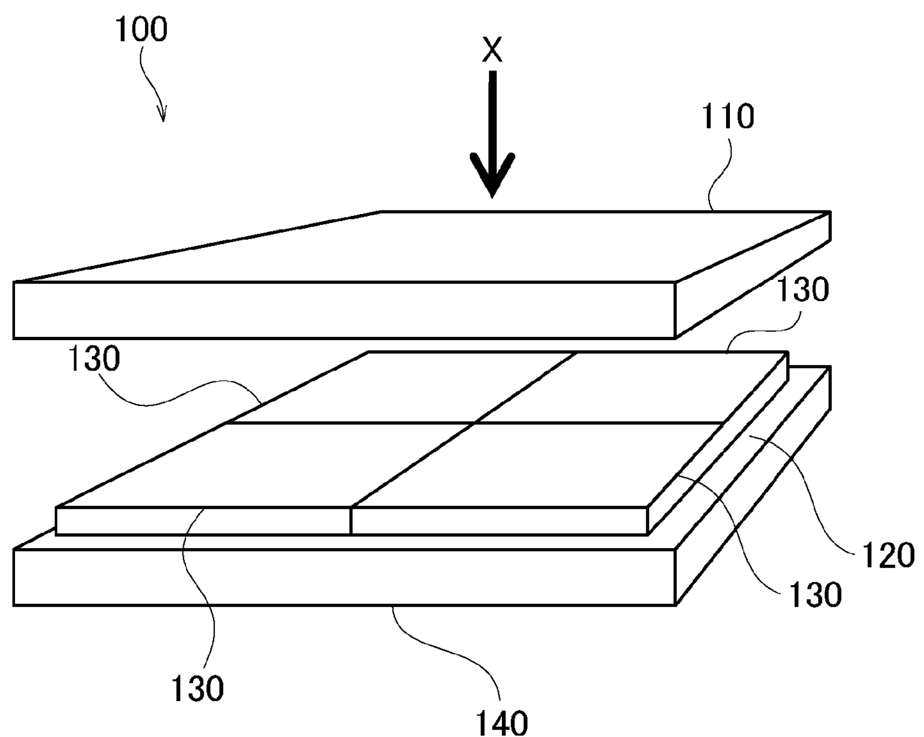
FIG. 1 is a schematic view illustrating a structure of a radiation image pickup apparatus according to a first embodiment.

A description will be given for an exemplary schematic structure of a radiation image pickup apparatus 100 according to a first embodiment of the present invention with reference to FIG. 1. FIG. 1 is an exploded perspective view illustrating the schematic structure of the radiation image pickup apparatus 100 according to the first embodiment. An arrow X in the drawing schematically indicates radiation which enters the radiation image pickup apparatus 100. For convenience of explanation, assume that the upper side (upper layer side) of the radiation image pickup apparatus 100 is regarded as a side from which the radiation X enters. The radiation image pickup apparatus 100 includes a scintillator portion 110 and an image pickup panel 120. In FIG. 1, the scintillator portion 110 and the image pickup panel 120 are illustrated separately for convenience of explanation, but in the actual apparatus, the scintillator portion 110 and the image pickup panel 120 are disposed in a laminated manner as will be described later.

The image pickup panel 120 includes a base 140 and a plurality of image pickup substrates 130. The plurality of image pickup substrates 130 is arranged side by side so as to form one image sensing surface as a whole. Further, the plurality of image pickup substrates 130 is fixed onto the base 140 respectively via connecting members 160 which will be described later (not illustrated in FIG. 1).

The image pickup substrate 130 includes a plurality of photoelectric-conversion elements 132 and 133 arranged in a matrix, and the photoelectric-conversion elements 132 and 133 detect light and convert the light to an electrical signal. As the photoelectric-conversion elements 132 and 133, a CMOS sensor using crystal silicon, or a PIN type or MIS type sensor using amorphous silicon may be applied, for example. Meanwhile, the image pickup substrate 130 may employ an existing structure capable of detecting light and converting the light to an electrical signal, and known various kinds of image pickup substrates may be applied. Therefore, a detailed description for the image pickup substrate 130 will be omitted.

The radiation X emitted to a subject from an external radiation source passes through the subject, attenuates, and then enters the scintillator portion 110. The scintillator portion 110 converts this radiation X to light with a wavelength that can be detected by the photoelectric-conversion elements 132 and 133 (e.g., visible light). The light converted at the scintillator portion 110 enters the image pickup substrate 130. The photoelectric-conversion elements 132 and 133 of the image pickup substrate 130 convert the incident light to an electrical signal. Consequently, an image based on this electrical signal is generated. Further, the radiation image pickup apparatus 100 may also obtain a moving image by repeating this procedure.

Figure 2:
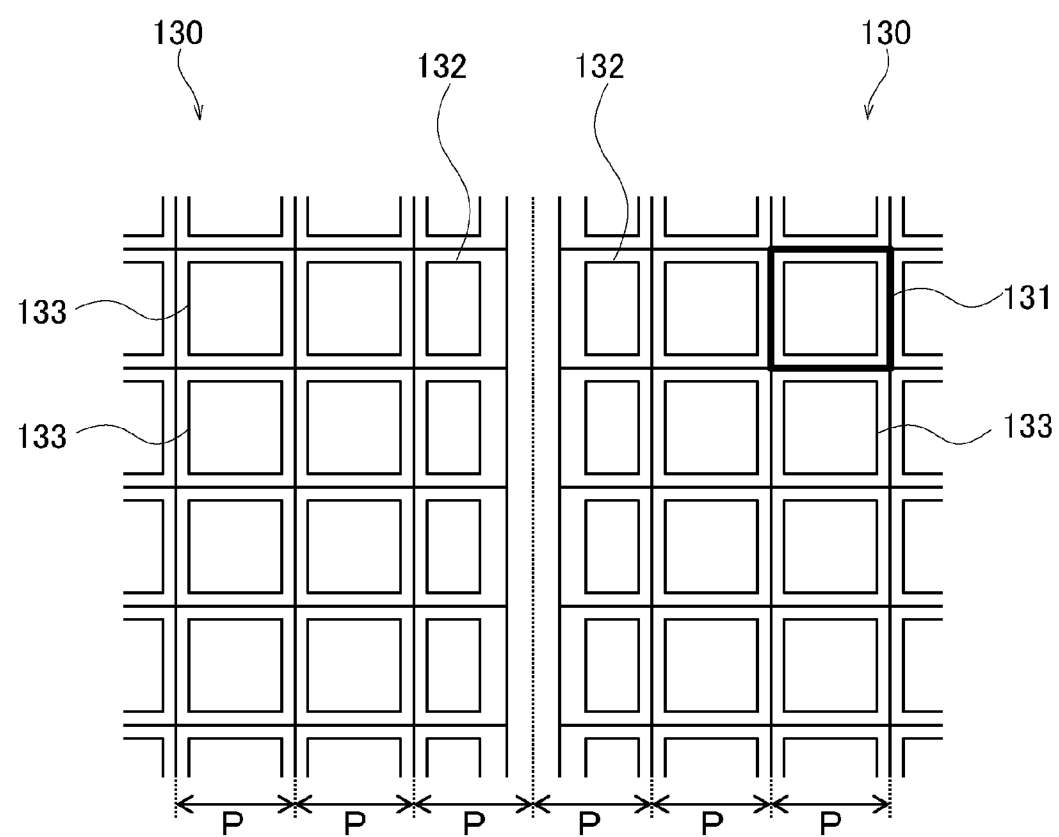
FIG. 2 is a plan view between image pickup substrates according to the first embodiment.

Next, a description will be given for an exemplary arrangement of pixels 131 of the image pickup substrate 130 in the radiation image pickup apparatus 100 with reference to a plan view in FIG. 2. FIG. 2 is the plan view schematically illustrating the exemplary arrangement of the pixels 131. As illustrated in FIG. 2, the respective image pickup substrates 130 include a plurality of pixels 131. Note that, in FIG. 2, contours of the pixels 131 are illustrated in solid lines for convenience of explanation, but these outlines may be invisible by the naked eyes of a human in the actual apparatus. Further, the respective pixels 131 include the photoelectric-conversion elements 132 and 133. In FIG. 2, the photoelectric-conversion elements of the pixels 131 positioned at peripheral portions of the image pickup substrate 130, i.e., the pixels 131 contacting an edge of the image pickup substrate 130, are indicated by the reference symbol "132", and the photoelectric-conversion elements of the pixels 131 excluding the photoelectric-conversion elements 132 are indicated by the reference symbol "133". As illustrated in FIG. 2, a space is generated between adjacent image pickup substrates 130. For this reason, an area of the photoelectric-conversion element 132 of the pixel 131 arranged at the edge of the image pickup substrate 130 is made smaller than an area of the other photoelectric-conversion element 133. With this structure, in the case where the plurality of image pickup substrates 130 is arranged side by side to form one image sensing surface, pixel pitches P in the entire image sensing surface may be equal. Therefore, distortion and the like of an image obtained by the radiation image pickup apparatus 100 may be reduced.

Figure 3:
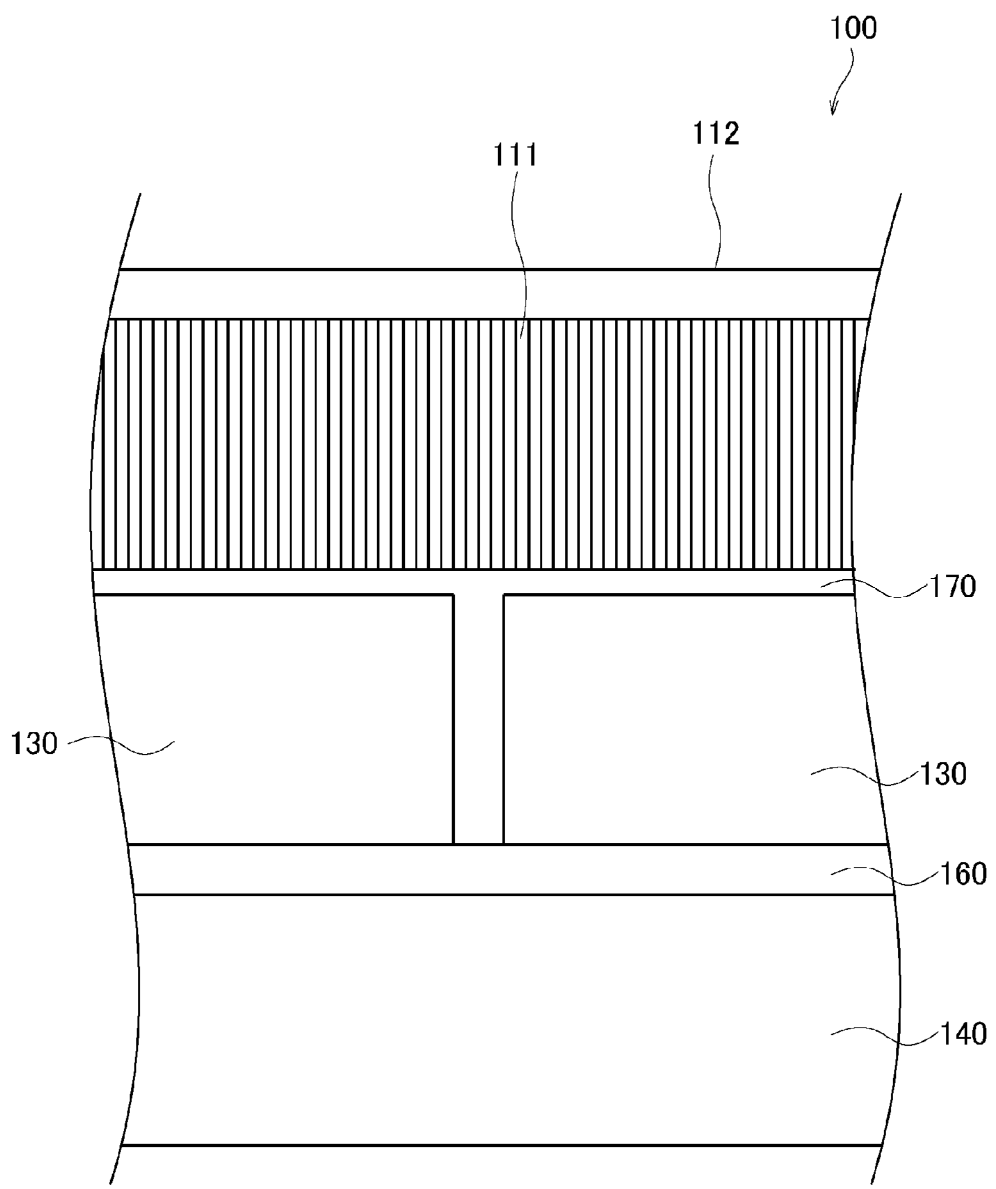
FIG. 3 is a cross-sectional view between the image pickup substrates according to the first embodiment.
Figure 4:
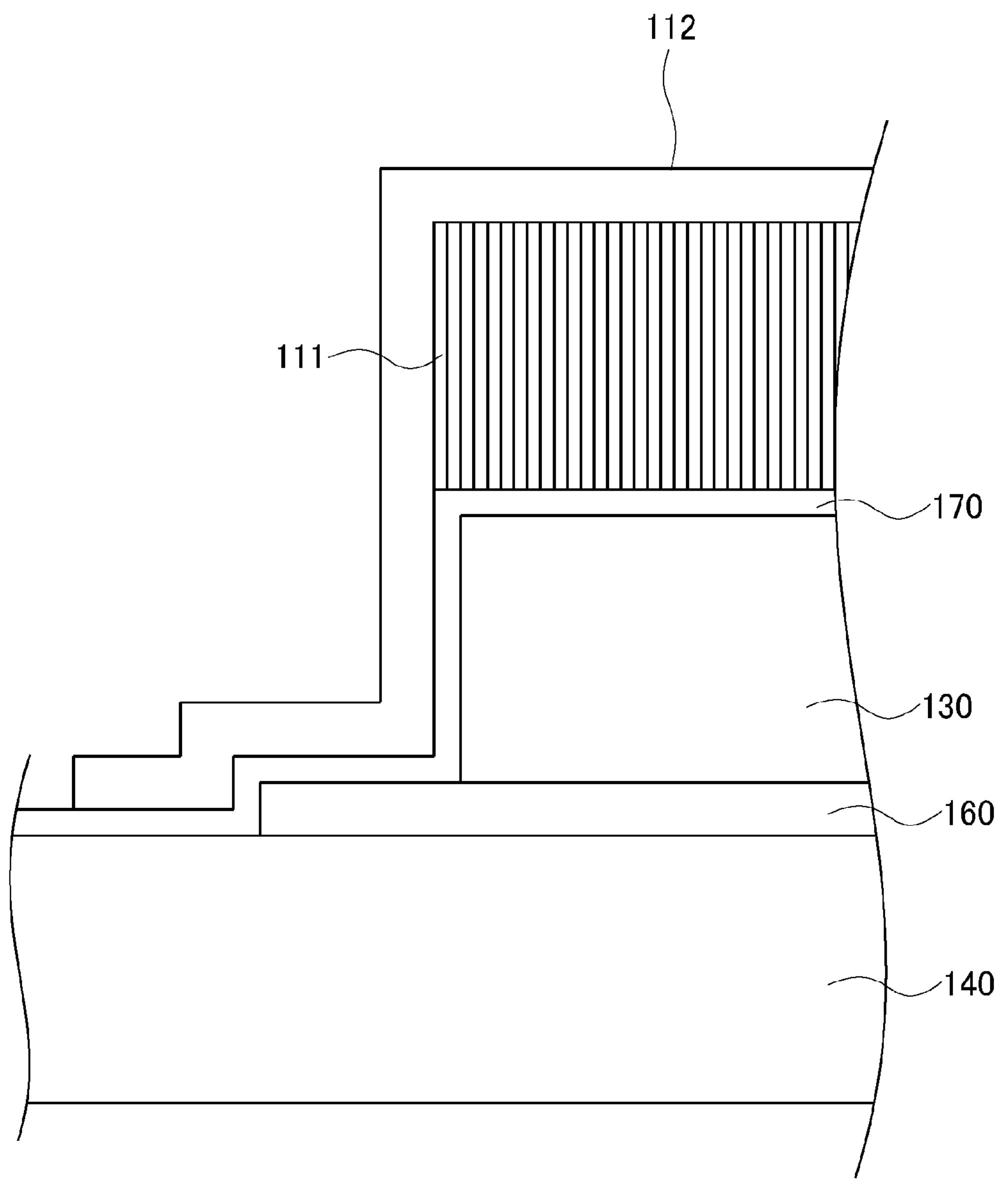
FIG. 4 is a cross-sectional view illustrating an end portion of the radiation image pickup apparatus according to the first embodiment.

Next, a description will be given for an example of a detailed structure of the radiation image pickup apparatus 100 with reference to cross-sectional views in FIGS. 3 and 4. FIG. 3 is the cross-sectional view schematically illustrating a structure in the vicinity of a boundary between the adjacent image pickup substrates 130, in the radiation image pickup apparatus 100. FIG. 4 is the cross-sectional view schematically illustrating a structure of an end portion of the radiation image pickup apparatus 100.

As illustrated in FIGS. 3 and 4, the plurality of image pickup substrates 130 is fixed onto the base 140 with the connecting member 160 such as adhesive or bond. Further, a moisture-proof layer 170 is formed on the image pickup substrates 130 and between the image pickup substrates 130. The moisture-proof layer 170 is configured to have water vapor permeability of 10 g/m2/day or less. Further, the surfaces of the plurality of image pickup substrates 130 are planarized by the moisture-proof layer 170.

A scintillator layer 111 is provided on the moisture-proof layer 170, and further a scintillator protection layer 112 is formed on the scintillator layer 111. Thus, the scintillator portion 110 including the scintillator layer 111 and the scintillator protection layer 112 is formed in the radiation image pickup apparatus 100. The scintillator layer 111 is formed of, for example, alkali halide-based columnar crystal. More specifically, the scintillator layer 111 includes thallium-doped (Tl-doped) pillar-like cesium iodide (CsI), and is formed by vapor deposition.

Meanwhile, as illustrated in FIG. 4, the scintillator protection layer 112 is formed extending from the upper layer of the scintillator layer 111 to above the upper surface of the base 140 at the end portion of the radiation image pickup apparatus 100. In other words, the scintillator layer 111 is covered with the moisture-proof layer 170 and the scintillator protection layer 112. Thus, the scintillator protection layer 112 prevents moisture from entering through the end portion of the radiation image pickup apparatus 100.

Here, a description will be given for an embodiment of the moisture-proof layer 170. As described above, the water vapor permeability of the moisture-proof layer 170 is 10 $g/m^2/day$ or less. Examples of a material, which has water vapor permeability per thickness 100 μm of 10 $g/m^2/day$ or less as specified by the Japan Industrial Standard (JIS) K7129_1, include an epoxy resin, a polyethylene resin, a polyester resin, a polypropylene resin, a urethane resin, and a polyphenylene sulfide resin. Also, the moisture-proof layer 170 may have water vapor permeability per thickness 100 μm of 1 $g/m^2/day$ or less as specified by the JIS K7129_1. Examples of such materials include a polyparaxylene resin, a polyvinylidene chloride resin, an aramid resin, a silicon oxide film, and a silicon nitride film. The water vapor permeability of the moisture-proof layer 170 may be obtained from the following formula: (water vapor permeability per thickness 100 μm as specified by JIS K7129_1)×(100 μm/film thickness (μm) of moisture-proof layer 170).

To select a suitable moisture-proof material for the moisture-proof layer 170, deliquescence of the scintillator layer 111 was visually evaluated after protecting the scintillator layer 111 with various kinds of moisture-proof materials and leaving the scintillator layer 111 for 120 hours in the environment of temperature 60° C. and humidity 95%. The results are given in FIG. 5.

The water vapor permeability of each moisture-proof material in the table is indicated as a representative value obtained from the evaluation executed under the following conditions: film thickness 100 μm, at the temperature 40° C. and the humidity 90%, and for a measurement time of 24 hours. Also, since the film thicknesses of the respective experiment samples are different from one another, the film thickness thereof is converted to the film length in a direction in which the moisture enters the scintillator layer 111 through the connecting member 160, provided that the space between the adjacent image pickup substrates 130 is 20 μm. Further, the water vapor permeability of the experiment samples (moisture-proof layer) is the value obtained by the above-mentioned formula. In the evaluation results in the table, the mark x indicates the case where deliquescence of the scintillator layer 111 occurred, and the mark o indicates the case where deliquescence did not occur. As illustrated in FIG. 5, in the structure where the moisture-proof layer 170 was formed of epoxy and had a film thickness of 120 μm, the water vapor permeability was 8.3 $g/m^2/day$ and deliquescence of the scintillator layer 111 did not occur. Also, in the structure where the moisture-proof layer 170 was formed of urethane and had a film thickness of 120 μm, the water vapor permeability was 4.2 $g/m^2/day$ and deliquescence of the scintillator layer 111 did not occur. In addition, in the structure where the moisture-proof layer 170 was formed of polyvinylidene chloride or polyparaxylene and had a film thickness of 10 μm, the water vapor permeability was 10 $g/m^2$/day and deliquescence of the scintillator layer 111 did not occur. In contrast, in the structure where the moisture-proof layer 170 was formed of silicone and had a film thickness of 120 μm, the water vapor permeability was 66.7 $g/m^2$/day and deliquescence of the scintillator layer 111 occurred. Also, in the structure where the moisture-proof layer 170 was formed of polyimide and had a film thickness of 10 μm, the water vapor permeability was 700 $g/m^2$/day and deliquescence of scintillator layer 111 occurred.

According to the present embodiment, since the image pickup substrate 130 has the thickness of 120 pm or more, the moisture-proof layer 170 formed between the image pickup substrates 130 comes to have a thickness of 120 pm or more. Therefore, from the experiment results illustrated in FIG. 5, any material that has water vapor permeability per thickness 100 μm of 10 $g/m^2$/day or less may be applied as the moisture-proof material.

As described above, the moisture-proof layer 170 that has water vapor permeability of 10 $g/m^2$/day or less is provided, at least between the connecting member 160 and the scintillator layer 111, between the plurality of image pickup substrates 130. With this structure, even in the case where any moisture enters through the connecting member 160 provided between the image pickup substrates 130 and the base 140, the moisture may be prevented or suppressed from reaching the scintillator layer 111. Therefore, deliquescence of the scintillator layer 111 by the moisture may be prevented. In other words, it is possible to provide the radiation detecting apparatus with high resistance to moisture which may enter from between the plurality of image pickup substrates 130.

Figure 6:
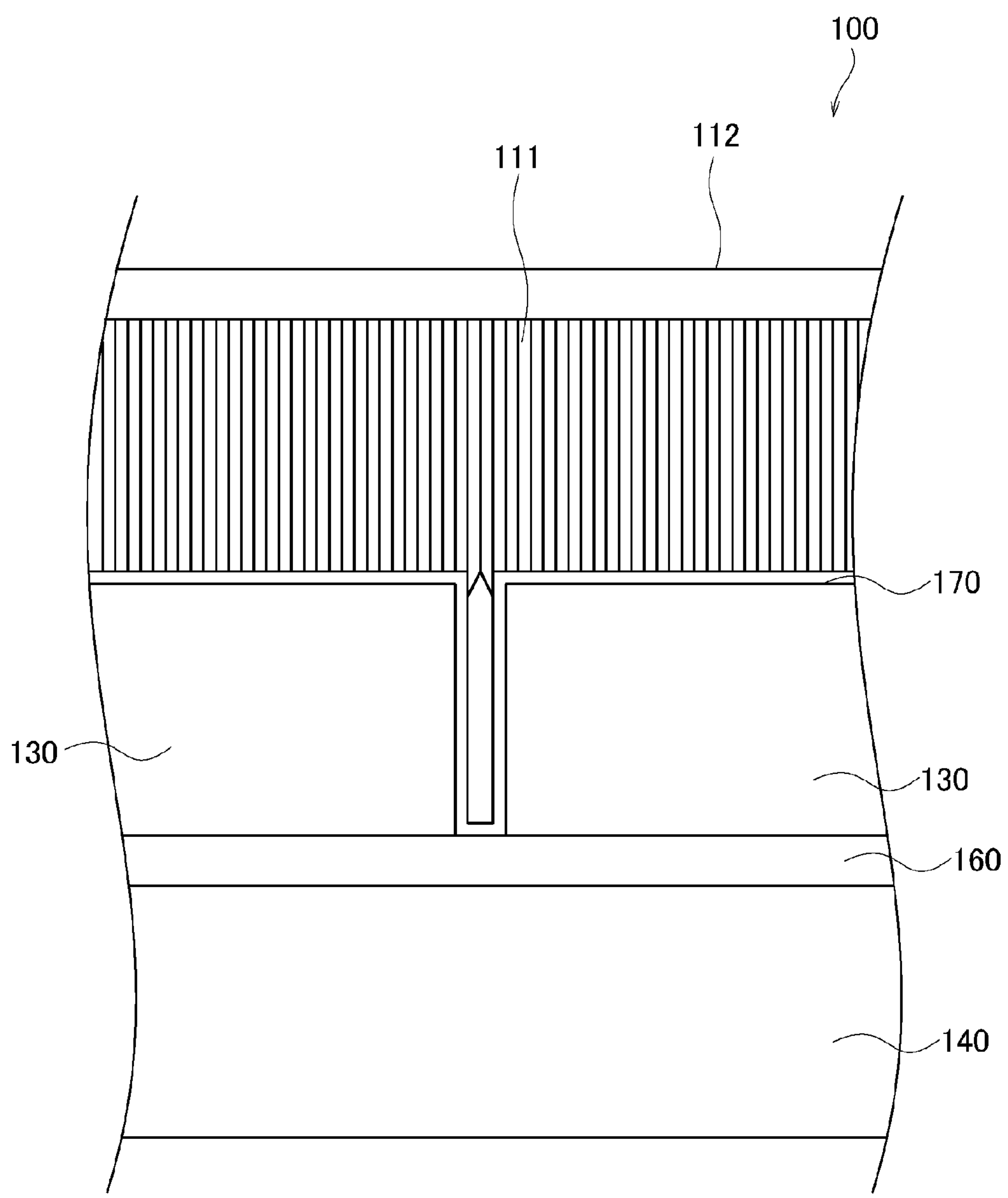
FIG. 6 is a cross-sectional view between the image pickup substrates according to the first embodiment.

Additionally, in the case where it is difficult to planarize the surface of the image pickup panel 120 by using the moisture-proof layer 170, a structure in which the moisture-proof layer 170 is formed along the image pickup substrates 130 may be applied as illustrated in FIG. 6. If a distance between the image pickup substrates 130 and the scintillator layer 111 is longer, the light emitted from the scintillator layer 111 may scatter before reaching the image pickup substrates 130, thereby possibly causing degradation of sharpness. Therefore, it is preferable that the thickness of the moisture-proof layer 170 be thin. More specifically, in the case where the thickness of the moisture-proof layer 170 is 20 μm or less, the degradation of sharpness hardly occurs. Thus, it is preferable that the thickness of the moisture-proof layer 170 provided between the image pickup substrates 130 be 20 μm or less. In this case, judging from the experiment results illustrated in FIG. 5, it is preferable to apply a structure in which the moisture-proof layer 170 is formed of the material that has water vapor permeability per thickness 100 μm of 1 $g/m^2$/day or less. Examples of the material suitable for the moisture-proof layer 170 in this case include a polyparaxylene resin, a polyvinylidene chloride resin, an aramid resin, a silicon oxide film, and a silicon nitride film.

As described above, in the case where the thickness of the moisture-proof layer 170 provided on the surfaces of the plurality of image pickup substrates 130 is equal to the thickness of the moisture-proof layer 170 provided between the plurality of image pickup substrates 130, it is preferable that the water vapor permeability per thickness 100 μm of the moisture-proof layer 170 be 1 $g/m^2$/day or less. With this structure, the same effect as above may be obtained.

(Second Embodiment)

Figure 7:
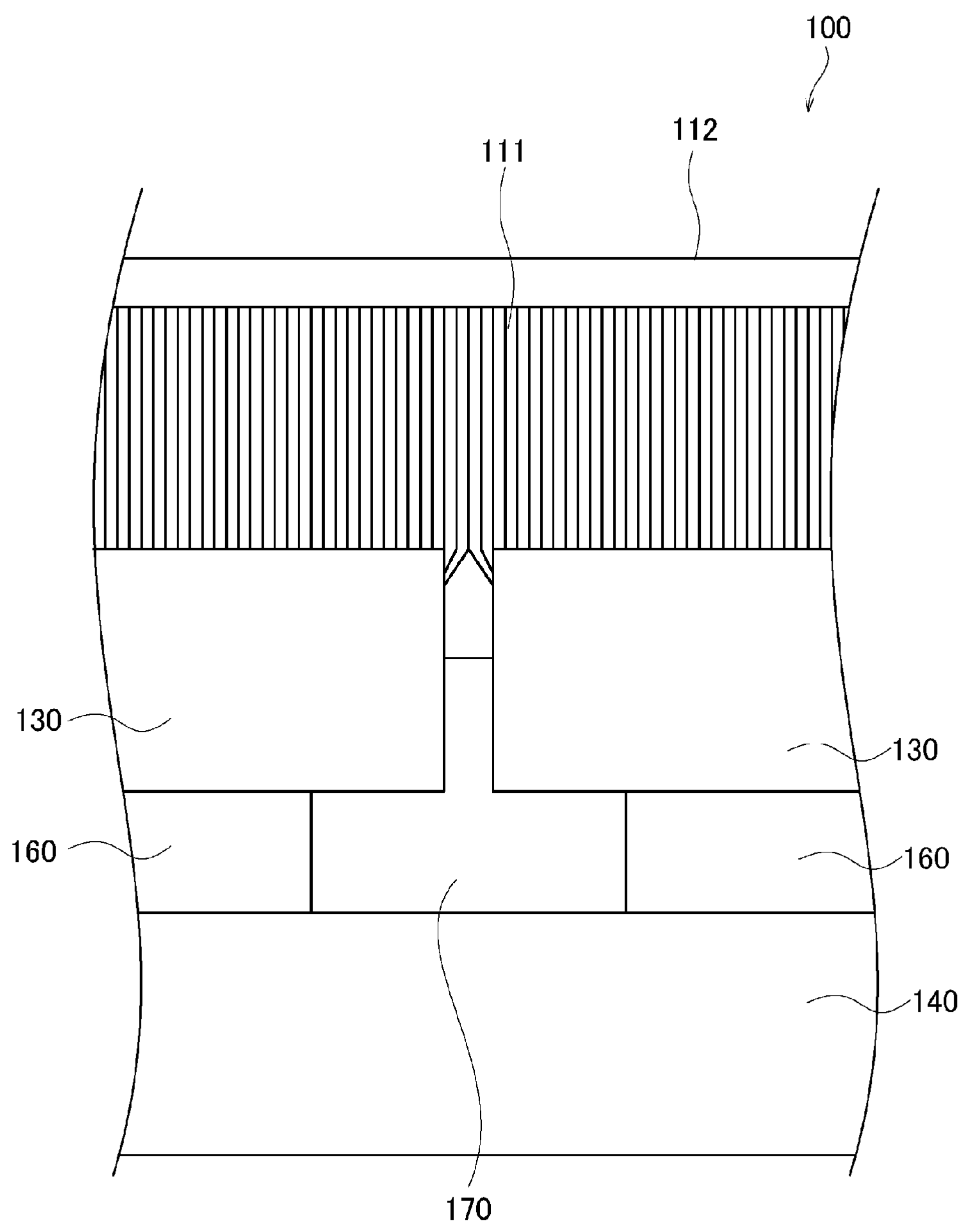
FIG. 7 is a cross-sectional view between image pickup substrates according to a second embodiment.

Next, a description will be given for an exemplary structure of a radiation image pickup apparatus 100 according to a second embodiment of the present invention with reference to FIG. 7. FIG. 7 is a cross-sectional view schematically illustrating a structure of the radiation image pickup apparatus 100 according to the second embodiment of the present invention. Note that operation principle of the radiation image pickup apparatus 100 and the structures of an image pickup substrate 130, photoelectric-conversion elements 132 and 133, etc. according to this embodiment are the same as those according to the first embodiment. Therefore, a description therefor will be omitted.

According to this embodiment, the image pickup substrate 130 is fixed onto a base 140 with a connecting member 160 such as adhesive or bond smaller than the image pickup substrate 130. In other words, the contour line (profile line) of the connecting member 160 is positioned more inside than the contour line of the image pickup substrate 130. For this reason, a space is formed between the connecting members 160 to bond the image pickup substrates 130 adjacent to each other. Accordingly, the moisture-proof layer 170 is provided between the connecting members 160 and between the image pickup substrates 130. Here, the thickness of the moisture-proof layer 170 is to be 120 μm or more because the thickness of the connecting member 160 is 120 μm or more.

Thus, as in the first embodiment, the moisture-proof layer 170 having water vapor permeability of 10 $g/m^2$/day or less is provided at least between the connecting member 160 and the scintillator layer 111, between the plurality of image pickup substrates 130. With this structure, even in the case where moisture enters through the connecting member 160 disposed between the image pickup substrate 130 and the base 140, the moisture may be prevented or suppressed from reaching the scintillator layer 111, thereby preventing deliquescence of the scintillator layer 111 by the moisture. In other words, it is possible to provide a radiation detecting apparatus having high resistance to the moisture which may enter from between the plurality of image pickup substrates 130.

An applicable method of forming the moisture-proof layer 170 is, for example, to form a liquid moisture-proof layer 170 between the connecting members 160 in advance, and then arrange the image pickup substrates 130. Also, another method therefor is to inject the liquid moisture-proof layer 170 between the image pickup substrates 130 after bonding the image pickup substrates 130 to the base 140 with the connecting members 160. In the case where the thickness of the connecting member 160 is 120 μm or more, the thickness of the moisture-proof layer 170 may be 120 μm or more according to the above-described methods.

Figure 8:
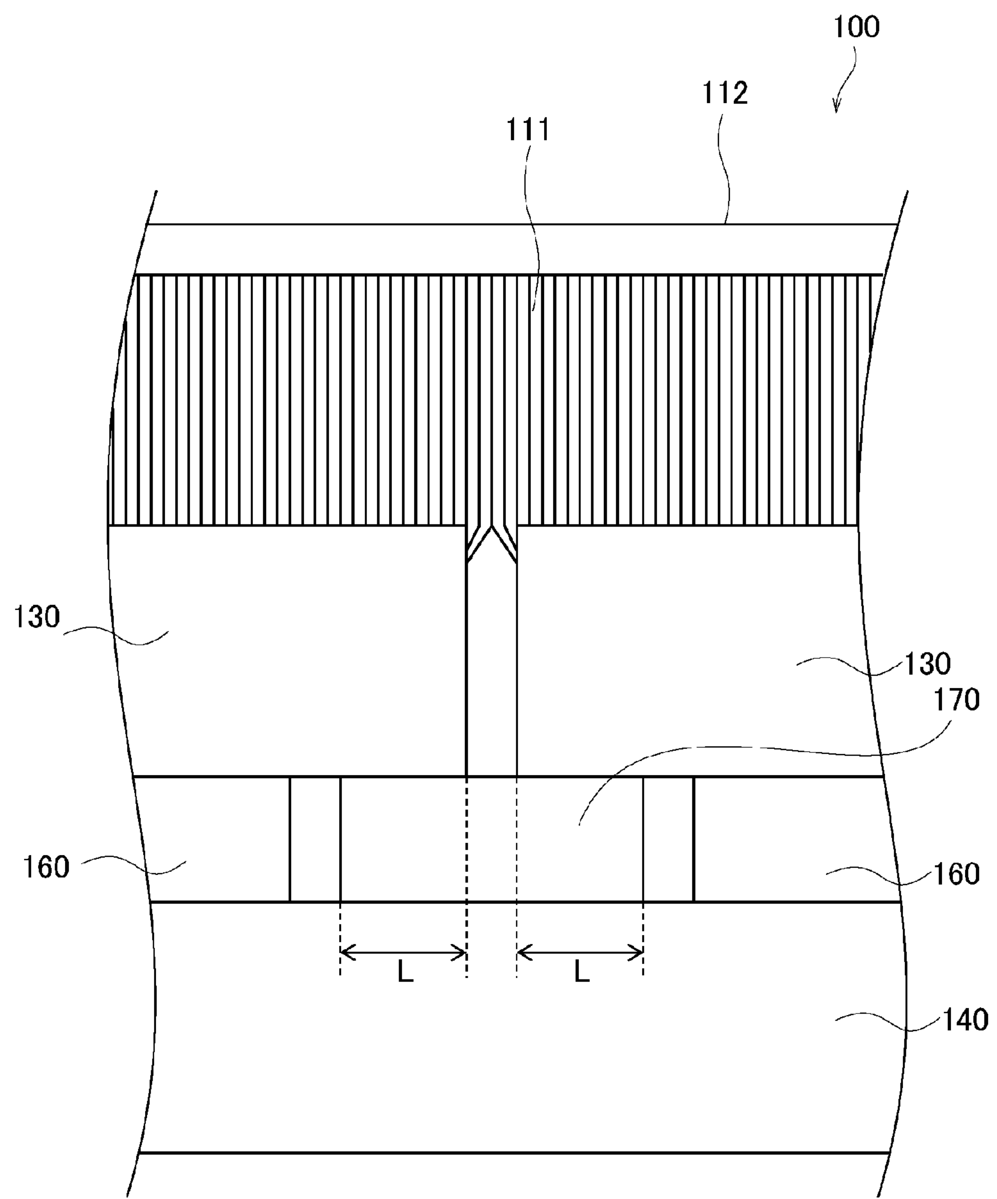
FIG. 8 is a cross-sectional view between the image pickup substrates according to the second embodiment.

Additionally, as illustrated in FIG. 8, it is possible to apply a structure in which a sheet moisture-proof layer 170 is provided between the connecting members 160, i.e., between the connecting member 160 and the scintillator layer 111, between the plurality of image pickup substrates 130 and the base 140. FIG. 8 is a cross-sectional view schematically illustrating a structure in which the sheet moisture-proof layer 170 is provided. In this case, the thickness of the moisture-proof layer 170 may be 120 μm or more for the moisture entering passage by forming a distance L to be 120 μm or more. The distance L is a length between one edge of the moisture-proof layer 170 contacting an image pickup substrate 130 and an extended line of an edge of the image pickup substrate 130 on the side adjacent to another image pickup substrate 130. Therefore, if the water vapor permeability of the moisture-proof layer 170 is 10 $g/m^2$/day or less, the same effect as above may be obtained.

(Third Embodiment)

Figure 9:
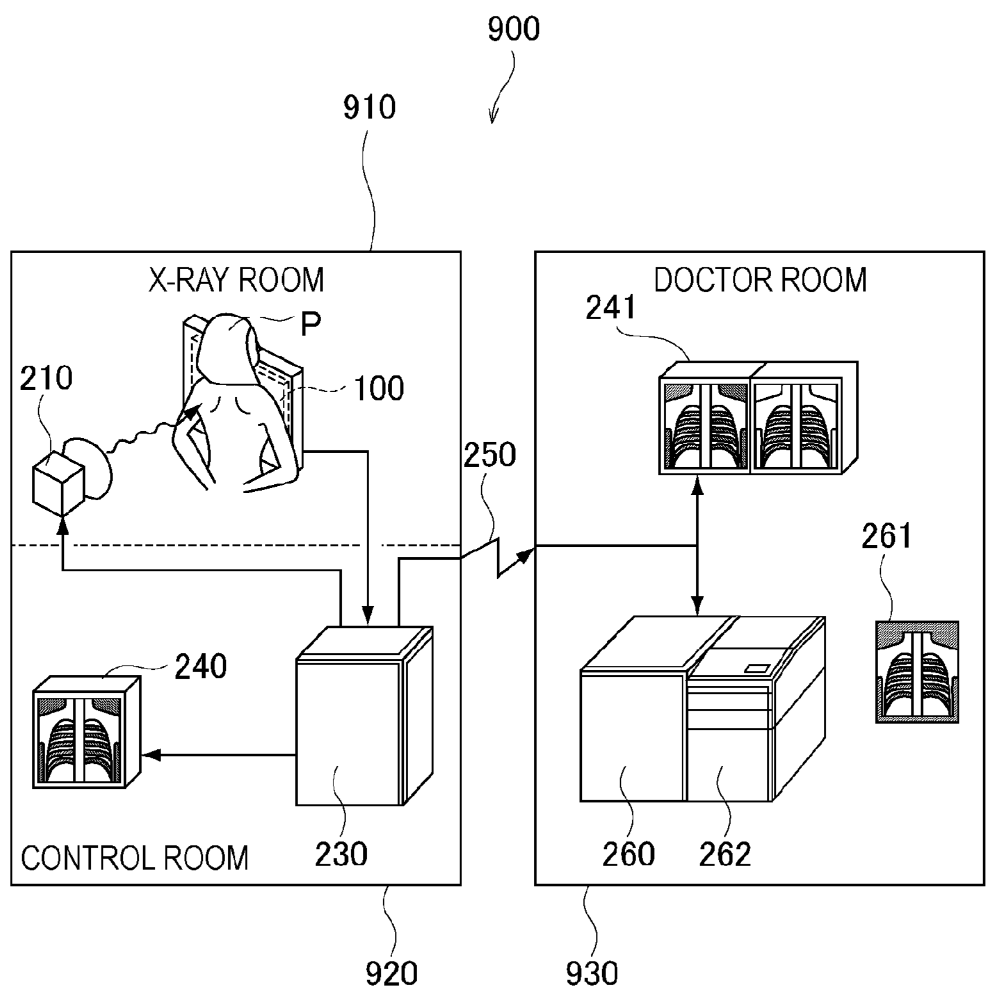
FIG. 9 is a schematic view illustrating an exemplary structure of a radiation image pickup system including the radiation image pickup apparatus according to an embodiment of the present invention.

Next, a description will be given for an X-ray diagnostic system 900 as a radiation image pickup system according to an embodiment of the present invention with reference to FIG. 9. FIG. 9 is a schematic diagram illustrating an exemplary structure of the X-ray diagnostic system 900 as the radiation image pickup system. The radiation image pickup apparatus 100 according to the above-described embodiments of the present invention is applied to this X-ray diagnostic system 900.

As illustrated in FIG. 9, the X-ray diagnostic system 900 includes an X-ray tube 210 as a radiation source, the radiation image pickup apparatus 100 according to the embodiments of the present invention, an image processor 230 as a signal processing unit, and a display 240 as a displaying unit. The X-ray tube 210 as the radiation source, and the radiation image pickup apparatus 100 are provided in an X-ray room (imaging room). The image processor 230 as the signal processing unit and the display 240 as the displaying unit are provided in a control room 920.

An X-ray generated as radiation by the X-ray tube 210 as the radiation source passes through an inspection target site of a subject P and enters the radiation image pickup apparatus 100 that includes the scintillator portion 110. The X-ray having entered the radiation image pickup apparatus 100 includes information regarding the inspection target site of the subject P. When the X-ray enters the radiation image pickup apparatus 100, the scintillator layer 111 emits light in response to the X-ray entrance. Further, photoelectric-conversion elements 132 and 133 provided in the image pickup substrate 130 convert the light emitted from the scintillator layer 111 to an electrical signal. This allows an X-ray image of the inspection target site of the subject P to be obtained as the electrical signal (X-ray image signal). This electrical signal is converted to a digital signal, and then transmitted to the image processor 230 which is provided as the signal processing unit. The image processor 230 performs image processing on the electrical signal (X-ray image signal), and then the electrical signal is output to the display 240 as the displaying unit of the control room 920. The display 240 displays the output electrical signal (X-ray image signal) as an image.

Meanwhile, known various radiation sources may be applied for the X-ray tube 210. Also, known various display units such as a liquid crystal display may be applied for the display 240. For the image processor 230 as the signal processing unit, a computer capable of executing a computer program to perform the signal processing including the image processing, or an apparatus including such a computer may be applied. More specifically, the computer includes a CPU, a RAM, and a ROM. Further, the computer includes a recording device capable of storing the electrical signal. The computer functions as the signal processing unit by the CPU reading the computer program stored in the ROM or the recording device in advance and executing the program using the RAM as a work area. Thus, the image processor 230 may perform image processing on the electrical signal (X-ray image signal).

Additionally, the X-ray diagnostic system 900 may further include a display 241, a film processor 260, a printer 261, etc. provided in a doctor room 930 located at a remote place from an X-ray imaging room 910 and the control room 920. In this case, it is possible to apply a structure in which the image processor 230, the display 241, the film processor 260, and the printer 261 are connected via a telephone line 250 and the like such that signals may be transmitted and received. Therefore, the electrical signal (X-ray image signal) processed by the image processor 230 may be transmitted to the display 241 or the film processor 260 in the doctor room 930, for example, via the telephone line 250 as a transmission unit. The display 241 may display the transmitted electrical signal (X-ray image signal). The film processor 260 may record the transmitted electrical signal (X-ray image signal) in a film as a recording medium. Further, the printer 261 may print the transmitted electrical signal (X-ray image signal) on a print paper as a recording medium.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-261485, filed Nov. 29, 2012, which is hereby incorporated by reference herein in its entirety.

What is claimed is:

1. A radiation image pickup apparatus comprising:

an image pickup panel in which a plurality of image pickup substrates are fixed onto a base, each of the image pickup substrates including a plurality of photoelectric-conversion elements;

a scintillator portion which includes a scintillator layer of alkali halide-based columnar crystal and is overlaid on the image pickup panel; and a moisture-proof layer provided between the base and the scintillator layer, at least between the plurality of image pickup substrates, wherein water vapor permeability of the moisture-proof layer is 10 $g/m^2$/day or less, and the scintillator portion further includes a scintillator protection layer to cover the scintillator layer together with the moisture-proof layer.

2. The radiation image pickup apparatus according to claim 1, further comprising a connecting member configured to fix the plurality of image pickup substrates onto the base, wherein the moisture-proof layer is provided between the connecting member and the scintillator layer, between the plurality of image pickup substrates and the base, and water vapor permeability of the moisture-proof layer in a portion between one edge of the moisture-proof layer contacting an image pickup substrate among the plurality of image pickup substrates and an extended line of an edge of the image pickup substrate on the side adjacent to another image pickup substrate is 10 $g/m^2$/day or less.

3. The radiation image pickup apparatus according to claim 1, wherein the moisture-proof layer is formed of any one of an epoxy resin, a polyethylene resin, a polyester resin, a polypropylene resin, a urethane resin, a polyphenylene sulfide resin, a polyparaxylene resin, a polyvinylidene chloride resin, an aramid resin, a silicon oxide film, and a silicon nitride film.

4. The radiation image pickup apparatus according to claim 3, wherein the moisture-proof layer is formed to have water vapor permeability per thickness 100 μm of 1 $g/m^2$/day or less and to have a thickness of 10 μm or more.

5. The radiation image pickup apparatus according to claim 4, wherein the moisture-proof layer is formed of any one of a polyparaxylene resin, a polyvinylidene chloride resin, an aramid resin, a silicon oxide film, and a silicon nitride film.

6. A radiation image pickup system comprising:

a radiation image pickup apparatus including:

an image pickup panel in which a plurality of image pickup substrates are fixed onto a base, each of the image pickup substrates including a plurality of photoelectric-conversion elements;

a scintillator portion which includes a scintillator layer of alkali halide-based columnar crystal and is overlaid on the image pickup panel; and a moisture-proof layer provided between the base and the scintillator layer, at least between the plurality of image pickup substrates, wherein water vapor permeability of the moisture-proof layer is 10 $g/m^2$/day or less, and the scintillator portion further includes a scintillator protection layer to cover the scintillator layer together with the moisture-proof layer; and a signal processing unit configured to process a signal obtained by the radiation image pickup apparatus.

7. A radiation image pickup apparatus comprising:

an image pickup panel in which a plurality of image pickup substrates are fixed onto a base, each of the image pickup substrates including a plurality of photoelectric-conversion elements;

a scintillator portion which includes a scintillator layer of alkali halide-based columnar crystal and is overlaid on the image pickup panel; and a moisture-proof layer provided between the base and the scintillator layer, at least between the plurality of image pickup substrates, wherein water vapor permeability of the moisture-proof layer is 10 $g/m^2$/day or less, and the scintillator portion further includes a scintillator protection layer to cover the scintillator layer together with the moisture-proof layer and the plurality of image pickup substrates.

8. The radiation image pickup apparatus according to claim 7, further comprising:

a connecting member configured to fix the plurality of image pickup substrates onto the base, wherein the moisture-proof layer is provided between the connecting member and the scintillator layer, between the plurality of image pickup substrates and the base, and water vapor permeability of the moisture-proof layer in a portion between one edge of the moisture-proof layer contacting an image pickup substrate among the plurality of image pickup substrates and an extended line of an edge of the image pickup substrate on the side adjacent to another image pickup substrate is 10 $g/m^2$/day or less.

9. The radiation image pickup apparatus according to claim 7, wherein the moisture-proof layer is formed of any one of an epoxy resin, a polyethylene resin, a polyester resin, a polypropylene resin, a urethane resin, a polyphenylene sulfide resin, a polyparaxylene resin, a polyvinylidene chloride resin, an aramid resin, a silicon oxide film, and a silicon nitride film.

10. The radiation image pickup apparatus according to claim 9, wherein the moisture-proof layer is formed to have water vapor permeability per thickness 100 μm of 1 $g/m^2$/day or less and to have a thickness of 10 μm or more.

11. The radiation image pickup apparatus according to claim 10, wherein the moisture-proof layer is formed of any one of a polyparaxylene resin, a polyvinylidene chloride resin, an aramid resin, a silicon oxide film, and a silicon nitride film.

12. A radiation image pickup system comprising:

a radiation image pickup apparatus including:

an image pickup panel in which a plurality of image pickup substrates are fixed onto a base, each of the image pickup substrates including a plurality of photoelectric-conversion elements;

a scintillator portion which includes a scintillator layer of alkali halide-based columnar crystal and is overlaid on the image pickup panel; and a moisture-proof layer provided between the base and the scintillator layer, at least between the plurality of image pickup substrates, wherein water vapor permeability of the moisture-proof layer is 10 $g/m^2$/day or less, and the scintillator portion further includes a scintillator protection layer to cover the scintillator layer together with the moisture-proof layer and the image pickup panel; and a signal processing unit configured to process a signal obtained by the radiation image pickup apparatus.

* * * * *